Patented Jan. 6, 1948

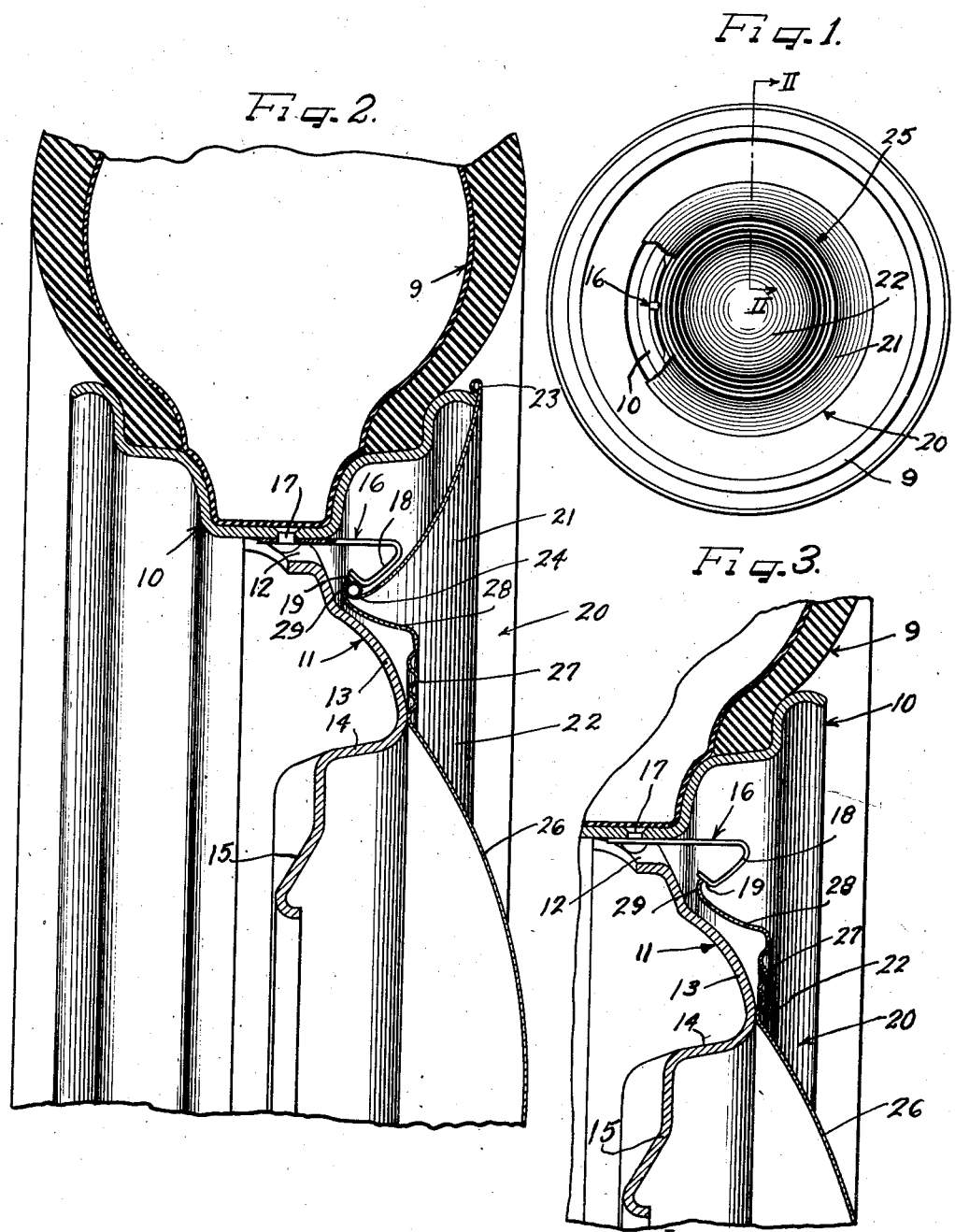

2,433,855

UNITED STATES PATENT OFFICE 2,433,855

WHEEL COVER

George Albert Lyon, Allenhurst, N. J.

Application May 12, 1945, Serial No. 593,472

10 Claims. (Cl. 301—37)

This invention relates to a wheel structure and more particularly to a novel cover assembly for detachable application over an exposed outer side of an automobile wheel.

An object of this invention is to provide a multi part wheel cover assembly or trim which will more readily accommodate allowable manufacturing tolerances in the parts of the wheel embraced by the assembly.

Another object of this invention is to provide a multi part wheel cover assembly which may economically be made of sheet metal and which by reason of the construction and arrangement of the parts will enable the cover to have an adjusted fit on the wheel parts irrespective of slight manufacturing variations in those wheel parts.

In accordance with the general features of this invention, there is provided in a cover structure for a wheel including tire rim and body parts and resilient retaining means, a wheel cover assembly comprising radially inner and outer concentric sections of sheet metal having at their junctions a shoulder engageable by the cover retaining means, the inner section having a flattened diaphragm-like portion yieldable axially toward the wheel upon engagement of the inner section by the outer section and of the shoulder with the retaining means whereby the outer section may be brought into tight contact with the rim part of the wheel.

Still another feature of the invention relates to the forming of the outer section of the aforesaid assembly in the form of an annular ring extending radially and axially inwardly from an outer edge of the wheel rim to a point over the body part whereby this outer section in use will appear to constitute a continuation of the outer side wall of the tire.

Other objects and features of this invention will more fully appear from the following detailed description taken in connection with the accompanying drawing which illustrates a single embodiment thereof, and in which Figure 1 is an outer side view of a wheel structure embodying the features of this invention and wherein the cover itself is partly broken away to show one of the cover retaining spring clips;

Figure 2 is an enlarged fragmentary cross sectional view taken on substantially the line II—II of Figure 1 looking in the direction indicated by the arrows; and Figure 3 is an enlarged fragmentary cross sectional view similar to Figure 2, but in which the outer ring of the cover itself has been omitted.

As shown on the drawing:

On the drawing I have illustrated more or less a conventional type of wheel provided, however, with novelly arranged spring clip means for retaining my cover assembly on the wheel.

This wheel includes a conventional pneumatic tube and tire designated generally by the reference character 9, the beads of which are mounted in the side flanges of a conventional multi-flanged drop center type of tire rim 10. The tire rim 10 is supported upon a load bearing or body part 11 which, as is well known in the art, may comprise a metallic stamping. This body part is sometimes referred to as a "wheel spider," since it includes spaced wheel openings 12 which alternate with the points of attachment of the body part to the base flange of the rim in a manner well known to those schooled in this art.

The body part 11 includes a dished bulge or nose 13 terminating in a depressed central portion 14, which in turn terminates in a generally radially extending bolt-on flange 15. As is well known in the art, this flange is adapted to be secured to a part on an axle such as a brake drum by means of bolts or cap screws (not shown).

In accordance with the features of this invention, I propose to utilize the wheel openings 12 to accommodate spring clips 16 all of which are identical. These spring clips may be three or four in number, depending upon the number of wheel openings 12. Each clip comprises a strip of highly resilient steel having its rearward portion extending into a wheel opening and secured by means of rivet 17 to the base flange of the rim part 10. The axially outer portion of this clip 16 is turned back upon itself at 18 into a loop and which turned back portion 18 terminates in an angular free extremity 19 adapted to exert a spring or wedging force against the cover in the retention of the cover on the wheel.

The multi part cover of my invention is designated generally by the reference character 20 and embraces principally two sections, namely a radially outer ring 21 and an inner or central circular member 22. Both of these members may be made from sheet steel. The outer ring 21 may comprise a stamping or may be made from rolled strip stock. The inner member 22 preferably comprises a punch press stamping. Excellent results may be obtained by making either or both of these parts of stainless steel. The outer ring 21 has an outer rearwardly rolled or turned edge 23 adapted to bear against and overhang an outer edge of the rim part 10, as shown in Figure 2. This ring 21 is of a curved or bowed cross sectional contour and extends radially and axially inwardly from the turned edge 23 to a point directly over the body part 11. In fact, as shown, the body part may be slightly indented to accommodate the junction of the inner turned edge 24 of the ring with the inner member 22.

In addition the ring may be provided with an aperture 25 (Figure 1) through which the end of a customary valve stem may project to afford access to the valve stem without the necessity of removing the ring 21 from the wheel.

The radially inner or circular member 22 includes a central crown portion 26 terminating at its outer margin in a corrugated flattened diaphragm bellows-like portion 27, which in turn terminates radially outwardly in a rearwardly inclined portion 28 having a curved rear edge 29 cooperable with the turned edge 24 of the ring 21.

In the application of my cover to the wheel, the inner or circular member 22 is first placed over the body part and pressed into the position shown in Figure 3. It will be perceived from that illustration that the turned outer edge 29 of this member 22 is of such a diameter that it can be pressed over and behind the turned extremities 19 of the spring clips 16. In other words, the spring clips may be employed to temporarily hold the member 22 on the wheel and until the outer ring 21 is applied thereto.

Thereafter the outer ring 21 is placed over the exposed outer side flange of the tire rim 10 and pressed axially so that its turned edge 24 is cammed over and behind the turned extremities 19 of the spring clips into nested retained cooperation with the slightly turned outer edge 29 of the central member 22. The turned edge 24 is of such diameter that in order for it to be pressed over the clips it must deflect the clips or the free extremities thereof radially outwardly; and as a consequence, the clips are caused to apply resilient retaining pressure against the turned edge 24. This pressure is of such moment that it forces the turned edge 24 tightly against the turned outer edge 29 of the central member 22, thus deflecting the outer margin of the member 22 axially toward the wheel body member from the position shown in Figure 3 to the position shown in Figure 2. This deflection of the outer edge 29 is enabled by reason of the diaphragm portion or section 27 resiliently yielding toward the body part permitting of the rearward displacement of edge 29.

The displacement of the edge 29 will be arrested when the outer edge of ring 21 bears against the outer edge of the rim part 10. This insures a tight fitting of the ring 21 against the wheel, or more particularly against the edge of the rim. Also, if it is so desired, the junction of the crown portion 26 and the diaphragm section 27 may bear against the nose portion 13 of the body part.

The advantage of the foregoing structure resides in the fact that my multi part cover is enabled to have a tailored or tight fit on the wheel irrespective of manufacturing tolerances in the body and rim parts of the wheel. In the fabrication of automobile wheels, I have observed that a tolerance of as much as one-eighth of an inch is permitted in the relative axial displacement of the rim and body parts. More specifically, the distance of the nose portion 13 of the wheel from the medial plane of the wheel may vary as much as one-eighth of an inch. This means that the cover in order to tightly bear against the wheel parts must in itself adjust for the wheel variations. I provide for this adjustment in the yielding of the diaphragm portion 27 toward and away from the body part of the wheel.

It will be further appreciated that since the outer portion 29 of the central member 22 is under tension and inasmuch as the spring clips are also under tension when the cover assembly is on the wheel the parts of the assembly can be held in tensioned cooperation with the wheel parts.

Disassembly of the parts of the cover may easily be effected in reverse order of their application. To effect removal of the ring 21, the edge of a pry-off tool such as a screw driver may be inserted under the turned edge 23 to forcibly pry the ring 21 out of its retained engagement with the spring clips 16. Thereafter the turned edge 29 of the central member 22 may be manually engaged at a point between the clips to pull it free of its retaining cooperation with the clips. In the course of this removal the clips yield in a generally radial direction so that the edges 24 and 29 may be cammed over and off of the free extremities of the clips.

The parts of my cover assembly lend themselves admirably to many different color contrasting finishes. One highly desirable combination is to furnish the exterior of the ring 21 in a white or eggshell color and to finish the central member 22 in a lustrous color. When the ring 21 is given a white or eggshell finish it will, in use, appear to constitute a white side wall part of the tire.

If it is so desired, the portion 28 of member 22 may have a lustrous or shiny finish, the portion 27 may have a contrasting color such for example as that used in the body of the vehicle, and the central portion 26 may be given a highly lustrous finish. Many different color combinations are feasible with the multi part assembly above described.

I claim as my invention:

1. In a cover structure for a wheel including flanged tire rim and body parts and cover retaining means, a cover assembly comprising a circular member for disposition over the outer side of the wheel and an outer annular cover ring for disposition opposite exposed side flanges of the rim part, said circular member having a resiliently flexible diaphragm portion and an adjoining turned outer portion, and said ring having an inner edge cooperable with said retaining means and engageable with said turned outer portion whereby said assembly is adapted to be retained under tension on the wheel, said circular member being engageable with the wheel body part radially inwardly of said diaphragm portion and said diaphragm portion being yieldable toward the wheel upon engagement by said edge until an outer portion of said ring tightly bears against the wheel rim part.

2. The structure of claim 1 further characterized by the circular member also including a central crown portion terminating at its outer periphery in said diaphragm portion and bearing against the wheel body part.

3. In a cover structure for a wheel including tire rim and body parts and resilient cover retaining means, a wheel cover assembly comprising radially inner and outer concentric sections of metallic sheet material and having at their junction a shoulder engageable by said cover retaining means, said inner section being engageable in assembly with the body part and including a diaphragm portion resiliently yieldable toward the wheel upon the outer section engaging the diaphragm portion of the inner section under the resilient force of the retaining means whereby said cover assembly may tightly bear against the wheel irrespective of manufacturing variations in the rim and body parts.

4. The structure of claim 3 further characterized by said diaphragm portion comprising a flattened area in the inner cover section and located radially inward of but in close proximity to said junction.

5. In a cover structure for a wheel including tire rim and body parts and resilient cover retaining means, a wheel cover assembly comprising radially inner and outer sections of metallic sheet material having at their junction a shoulder adapted to be retained by said cover retaining means, said inner section having a flattened portion yieldable axially toward the wheel upon engagement of said inner section by said outer section and said shoulder with said retaining means while the inner section inwardly of said flattened portion rests against the wheel body part.

6. In a cover structure for a wheel including tire rim and body parts and resilient cover retaining means, a wheel cover assembly comprising radially inner and outer sections of metallic sheet material having at their junction a shoulder adapted to be retained by said cover retaining means, said inner section having a flattened portion yieldable axially toward the wheel upon engagement of said inner section by said outer section and said shoulder with said retaining means while the inner section inwardly of said flattened portion rests against the wheel body part, said flattened portion being corrugated to enhance its resiliency and whereby an outer margin of the inner section may radially give way when pressed toward the wheel by the outer section under the spring force of the retaining means.

7. In a cover structure for a wheel including tire rim and body parts and resilient cover retaining means, a wheel cover assembly comprising radially inner and outer sections of metallic sheet material having at their junction a shoulder adapted to be engaged by said cover retaining means, said inner section having a flattened portion yieldable axially toward the wheel upon engagement of said inner section by said outer section and said shoulder with said retaining means while the inner section inwardly of said flattened portion rests against the wheel body part, said outer section comprising an annular ring extending radially and axially rearwardly from an outer edge of the rim part to said junction and opposite a side surface of the wheel body part and being of such cross sectional configuration that in use it appears to constitute a continuation of the side wall of the tire.

8. In a wheel structure including a tire rim part and a load sustaining body part, a cover member engaging said body part and having a radially outwardly extending diaphragm portion spaced from the body part and formed with an outer cover annulus engagement portion, a cover annulus engaging said engagement portion at an inner edge and extending generally radially outwardly therefrom into concealing relation relative to the tire rim, and cover retaining means carried by the wheel structure and engaging the juncture of said cover annulus and engagement portion and bearing against said juncture to force the diaphragm portion yieldably axially inwardly toward the body portion of the wheel structure.

9. In combination in a wheel structure of the character described, a tire rim, a load sustaining body portion supporting said tire rim, cover retaining means, and a cover comprising an inner section resting against the wheel body and having a radially outwardly extending diaphragm portion formed at its outer edge with a generally axially inwardly extending, outwardly curved seat and an outer cover annulus engaging at its inner edge within said seat and extending generally radially outwardly into concealing relation to the tire rim, said tire rim having cover retaining means thereon engaging the cover at the juncture of said inner section and outer annulus and effecting an inwardly flexed tensioned condition in the diaphragm.

10. In a wheel structure including a tire rim and a body part and resilient cover retaining means, a wheel cover assembly comprising radially inner and outer sections having at their juncture a shoulder engaged by said cover retaining means, said inner section having a flattened portion yieldable axially toward the wheel and lying in spaced relation to the wheel body, said inner section engaging the wheel body radially inwardly of said yieldable flattened portion.

GEORGE ALBERT LYON.

REFERENCES CITED

The following references are of record in the file of this patent:

UNITED STATES PATENTS

| Number | Name | Date |
| --- | --- | --- |
| 2,368,232 | Aske | Jan. 30, 1945 |
| 2,214,747 | Lyon | Sept. 17, 1940 |
| 2,368,240 | Lyon | Jan. 30, 1945 |